R. H. DALZELL.
PIPE-PLUG.

No. 192,324.

Patented June 26, 1877.

Witnesses
D. P. Cowl
Geo. Bacon

Inventor
Robert H. Dalzell
by Bakewell & Kerr
Attys

UNITED STATES PATENT OFFICE.

ROBERT H. DALZELL, OF KILBUCK TOWNSHIP, ALLEGHENY COUNTY, ASSIGNOR TO A. FILSON DALZELL, TRUSTEE, OF PITTSBURG, PA.

IMPROVEMENT IN PIPE-PLUGS.

Specification forming part of Letters Patent No. 192,324, dated June 26, 1877; application filed June 1, 1877.

*To all whom it may concern:*

Be it known that I, ROBERT H. DALZELL, of Kilbuck township, in the county of Allegheny and State of Pennsylvania, have invented a new and useful Improvement in Pipe-Plugs; and I do hereby declare the following to be a full, clear, and exact description thereof, reference being had to the accompanying drawing, forming part of this specification, in which—

Figure 1:
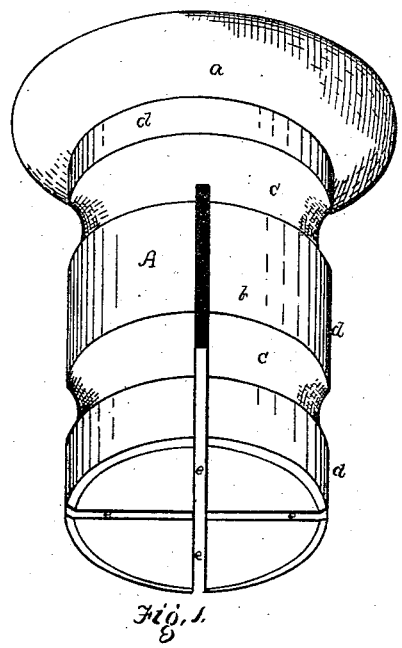
Figure 2:
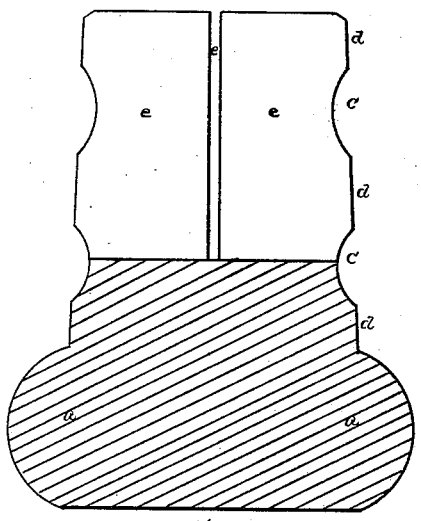
Figure 3:
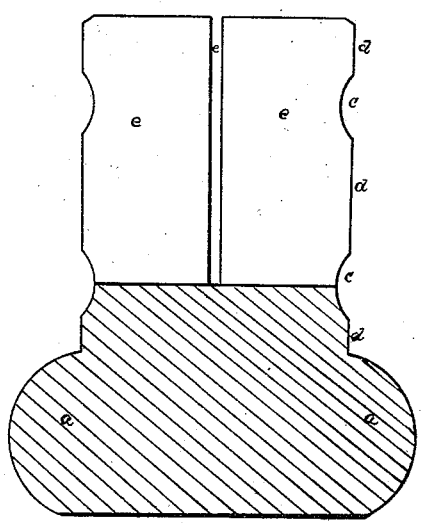

Figure 1 is a perspective view of a plug embodying my invention; Fig. 2, a longitudinal central section of one modification. Fig. 3 is a similar section of another modifiation.

Like letters refer to like parts wherever they occur.

My invention relates to the construction of plugs for protecting the threaded ends of pipe and tubing; and consists, first, in forming the plug so that it can be sprung into the end of the pipe or tubing; and, secondly, in providing a spring-plug with one or more bearing-rings.

In the handling and transportation of pipe or tubing having threaded ends—as, for instance, oil-well tubing—great loss and trouble is constantly arising from injury to the threads. To overcome this trouble one end of the tubing is usually protected by screwing thereon the thimble or socket employed for uniting sections of tubing; and into the opposite end of the pipe a straight or tapered plug is driven. But such plugs as are ordinarily employed for the purpose specified are found to be very inefficient, as many are lost from the tubing in cartage, and many more are displaced by the jar incident to transportation by rail, so that twenty-five or thirty per cent. of the threaded tubing will be injured, and ten to twenty per cent. so battered as to require the threads to be recut.

The loss of time and expense incurred, especially in tubing oil-wells (which are often ten or fifteen miles from town) are so great that many manufacturers go to the expense of making a short socket or threaded collar for the ends of tubing not protected by the usual socket, as before mentioned.

The object of the present invention is to construct an efficient plug, which will take the place of the present inefficient plug and the expensive threaded ring or collar.

I will now proceed to describe my invention, so that others skilled in the art to which it appertains may apply the same.

In the drawing, A indicates the plug, usually formed from suitable wood, and turned with a head, $a$, of sufficient diameter to extend beyond the outer surface of the tubing with which the plug is to be employed.

The body $b$ of the plug is slightly greater in diameter than the bore of the tube with which it is to be used, and may have parallel sides, as shown in Fig. 1, or may taper somewhat from head to point, as in Fig. 2, or from point to head, as shown in Fig. 3, and is surrounded by groove or grooves $c$, so as to form projections or bearing-rings $d$. The plug, having been turned out or otherwise formed with the head and bearing-rings specified, is next cut or grooved, as indicated at $e$, in lines more or less parallel to the axis of the body $b$, or in such other manner as will render the body somewhat compressible and expansible, so that it can be readily forced into the end of a pipe or tubing, and when in position will expand and hold against the inner surface of said tubing.

Theoretically, the plug tapering from point to head should be the most efficient, and the width of cuts $e$ should correspond to the excess of the diameter of the plug over the interior diameter of the pipe with which it is to be employed; but in actual practice I have found the plug with parallel sides equally efficient, and the proportion of the cuts $e$ to the excess of diameter not material.

If preferred, the central ring of the series of bearing-rings may have the greatest diameter.

When employed, the plug described is driven into the end of the pipe or tubing, the body $b$ expanding therein so as to take against the inner surface of the pipe and the projecting head $a$, preventing the threaded end of the pipe or tube from coming in contact with surfaces likely to injure the same. If the weight of the pipe comes upon the end of plug A, or the tubing is jolted about as in transportation, the plug may move laterally by pivoting on the bearing-rings $d$, but will not move lengthwise so as to shake out or be displaced.

The advantages of my invention are that a cheap, efficient, and reliable plug for protecting the threaded ends of pipe or tubing during transportation is obtained, and one which will obviate, to a great extent, the loss of time and expense incident to recutting threads upon tubing injured in transit.

Having thus described my invention, what I claim, and desire to secure by Letters Patent, is—

1. The plug for threaded pipes or tubes, said plug having a head adapted to project beyond the threaded surface, and a compressible and expansible body, substantially as specified.

2. The plug for threaded tubing, having a head adapted to project beyond the threaded surface, and a compressible and expansible body furnished with bearing-rings, substantially as specified.

In testimony whereof I, the said ROBERT H. DALZELL, have hereunto set my hand.

ROBERT H. DALZELL.

Witnesses:
JAMES I. KAY,
F. W. RITTER, Jr.